(12) United States Patent
Cardno (10) Patent No.: US 6,871,194 B1
(45) Date of Patent: Mar. 22, 2005

(54) INTERACTION PREDICTION SYSTEM AND METHOD

(75) Inventor: Andrew John Cardno, Wellington (NZ)

(73) Assignee: Compudigm International Limited, Wellington (NZ)

( * ) Notice: Subject to any disclaimer, the term of this patent is extended or adjusted under 35 U.S.C. 154(b) by 497 days.

(21) Appl. No.: 09/674,468

(22) PCT Filed: Jul. 13, 2000

(86) PCT No.: PCT/NZ00/00125

§ 371 (c)(1),
(2), (4) Date: Mar. 23, 2001

(87) PCT Pub. No.: WO01/04808

PCT Pub. Date: Jan. 18, 2001

(30) Foreign Application Priority Data

Jul. 13, 1999 (NZ) ................................................ 336743

(51) Int. Cl.[7] .......................................... G06F 15/00
(52) U.S. Cl. ...................................................... 706/21
(58) Field of Search ..................... 706/15–21

(56) References Cited

U.S. PATENT DOCUMENTS

| | | | |
|---|---|---|---|
| 5,444,820 A | 8/1995 | Tzes et al. ...................... | 706/21 |
| 5,470,079 A | * 11/1995 | LeStrange et al. ............. | 463/25 |
| 5,722,893 A | * 3/1998 | Hill et al. ........................ | 463/47 |
| 5,774,868 A | 6/1998 | Cragun et al. .................. | 705/10 |
| 5,819,226 A | * 10/1998 | Gopinathan et al. ........... | 705/44 |
| 5,879,234 A | * 3/1999 | Mengual ......................... | 463/20 |
| 6,029,139 A | 2/2000 | Cunningham et al. ......... | 705/10 |
| 6,032,125 A | 2/2000 | Ando ............................... | 705/10 |
| 6,039,650 A | * 3/2000 | Hill ................................. | 463/47 |
| 6,299,536 B1 | * 10/2001 | Hill ................................. | 463/47 |
| 6,508,707 B2 | * 1/2003 | DeMar et al. .................. | 463/16 |
| 6,520,855 B2 | * 2/2003 | DeMar et al. .................. | 463/20 |
| 6,582,301 B2 | * 6/2003 | Hill ................................. | 463/11 |

FOREIGN PATENT DOCUMENTS

JP 10-5413 1/1998 ............. A63F/7/02

OTHER PUBLICATIONS

The evolution of blackjack strategies Kendall, G.; Smith, C.; Evolutionary Computation, 2003. CEC '03. The 2003 Congress on, vol.: 4, Dec. 8–12, 2003 pp.: 2474–2481 vol. 4.*
Parallelism speeds data mining Reese Hedberg, S.; Parallel & Distributed Technology: Systems & Applications, IEEE [see also IEEE Concurrency], vol.: 3, Issue: 4, Winter 1995, pp.: 3–6.*
Evolving an expert checkers playing program without using human expertise Chellapilla, K.; Fogel, D.B.; Evolutionary Computation, IEEE Transactions on, vol.: 5, Issue: 4, Aug. 2001 pp.: 422–428.*

(List continued on next page.)

*Primary Examiner*—Anthony Knight
*Assistant Examiner*—Michael B. Holmes
(74) *Attorney, Agent, or Firm*—Dorsey & Whitney LLP (57) ABSTRACT

The invention provides an interaction prediction system comprising a memory in which is maintained a neural network trained on data retrieved from an interaction database of interaction data representing interactions between customers and merchants, retrieval means arranged to activate the neural network and to retrieve prediction data representing future interactions between customers and merchants, and display means arranged to display a representation of the prediction data. The invention also provides a neural network training system in which a neural network is arranged to receive input data representing the data retrieved from the interaction database and to output prediction data representing interaction data predicted by the neural network. The invention also provides computer programs and methods of interaction prediction and neural network training respectively.

27 Claims, 7 Drawing Sheets

OTHER PUBLICATIONS

Application of temporal difference learning method to computer gaming Baba, N.; Takagawara, Y.;Knowledge–Based Intelligent Electronic Systems, 1998. Proceedings KES '98. 1998 Second International Conference on, vol.: 3, Apr. 21–23, 1998 pp.: 36–39.*

Application of neural networks to computer gaming Baba, N.; Kita, T.; Oda, N.; Neural Networks, 1995. Proceedings., IEEE International Conference on, vol.: 1, Nov. 27–Dec. 1, 1995 pp.: 550–554 vol. 1.*

Time–delay neural networks for estimating lip movements from speech analysis: a useful tool in audio–video synchronization Lavagetto, F.; Circuits and Systems for Video Technology, IEEE Transactions on, vol.: 7, Issue: 5, Oct. 1997 pp.: 786–800.*

Coupled chaotic dynamical system and the solution for gambling game problems Pilian He; Hong Chang; Mei Tian; Neural Networks, 2001. Proceedings. IJCNN '01. International Joint Conference on, vol.: 4, Jul. 15–19, 2001 pp.: 2564–2567 vol. 4.*

Utilization of hierarchical structure stochastic automata for neural network learningBaba, N.; Mogami, Y.; Neural Networks, 1994. IEEE World Congress on Computational Intelligence., International Conference on, vol.: 2, Jul. 27, 1994 pp.: 811–816.*

* cited by examiner

FIGURE 7

INTERACTION PREDICTION SYSTEM AND METHOD

FIELD OF INVENTION

The invention relates to an interaction prediction system and method, particularly but not solely designed for predicting future revenue from individual gaming machines in a casino.

BACKGROUND TO INVENTION

The low cost of data storage hardware has led to the collection of large volumes of data Merchants, for example, generate and collect large volumes of data during the course of their business. To compete effectively, it is necessary for a merchant to be able to identify and use information hidden in the collected data. This data could include revenue from gaming machines in a casino. The task of identifying this hidden information has proved very difficult for merchants.

Traditionally, analysis of data has been achieved by running a query on a set of data records stored in a database. The merchant or other party first creates a hypothesis, converts this hypothesis to a query, runs the query on the database, and interprets the results with respect to the original hypothesis.

One disadvantage of this verification-driven hypothesis approach is that the merchant must form the desired hypothesis in advance. This is merely confirming what the merchant already suspects and does not provide the merchant with information which may be unexpected. Another disadvantage is that the merchant needs to have available the technical knowledge to formulate what are often very difficult and complex queries.

SUMMARY OF INVENTION

In broad terms the invention comprises an interaction prediction system comprising a memory in which is maintained a neural network trained on data retrieved from an interaction database of interaction data representing interactions between customers and merchants; retrieval means arranged to activate the neural network and to retrieve prediction data representing future interactions between customers and merchants; and display means arranged to display a representation of the prediction data.

In another form in broad terms the invention comprises a neural network training system comprising a memory in which is maintained an interaction database of interaction data representing interactions between customers and merchants; retrieval means arranged to retrieve from the interaction database data representing interactions between customers and merchants; a neural network arranged to receive input data representing the data retrieved from the interaction database and to output prediction data representing interaction data predicted by the neural network; and training means arranged to compare the data retrieved from the interaction database and the prediction data and to adjust the neural network based on the comparison.

In another form in broad terms the invention comprises an interaction prediction computer program comprising a neural network maintained in a memory, the neural network trained on data retrieved from an interaction database of interaction data representing interactions between customers and merchants; retrieval means arranged to activate the neural network and to retrieve prediction data representing future interactions between customers and merchants; and display means arranged to display a representation of the prediction data.

In a further form in broad terms the invention comprises a neural network training computer program comprising an interaction database of interaction data representing interactions between customers and merchants maintained in a memory; retrieval means arranged to retrieve from the interaction database data representing interactions between customers and merchants; a neural network maintained in a memory, the neural network arranged to receive input data representing the data retrieved from the interaction database and to output prediction data representing interaction data predicted by the neural network; and training means arranged to compare the data retrieved from the interaction database and the prediction data and to adjust the neural network based on the comparison.

In another form in broad terms the invention comprises a method of predicting interactions between customers and merchants, the method comprising the steps of maintaining in a memory a neural network trained on data retrieved from an interaction database of interaction data representing interactions between customers and merchants; activating the neural network; retrieving prediction data representing future interactions between customers and merchants from the neural network; and displaying a representation of the prediction data.

In another form in broad terms the invention comprises a method of training a neural network comprising the steps of maintaining in a memory an interaction database of interaction data representing interactions between customers and merchants; retrieving from the interaction database data representing interactions between customers and merchants; arranging a neural network to receive input data representing the data retrieved from the interaction database and to output prediction data representing interaction data predicted by the neural network; and comparing the data retrieved from the interaction database and the prediction data and adjusting the neural network based on the comparison.

BRIEF DESCRIPTION OF THE FIGURES

Preferred forms of the interaction prediction system and method will now be described with reference to the accompanying Figures in which.

DETAILED DESCRIPTION OF PREFERRED FORMS

Figure 1:
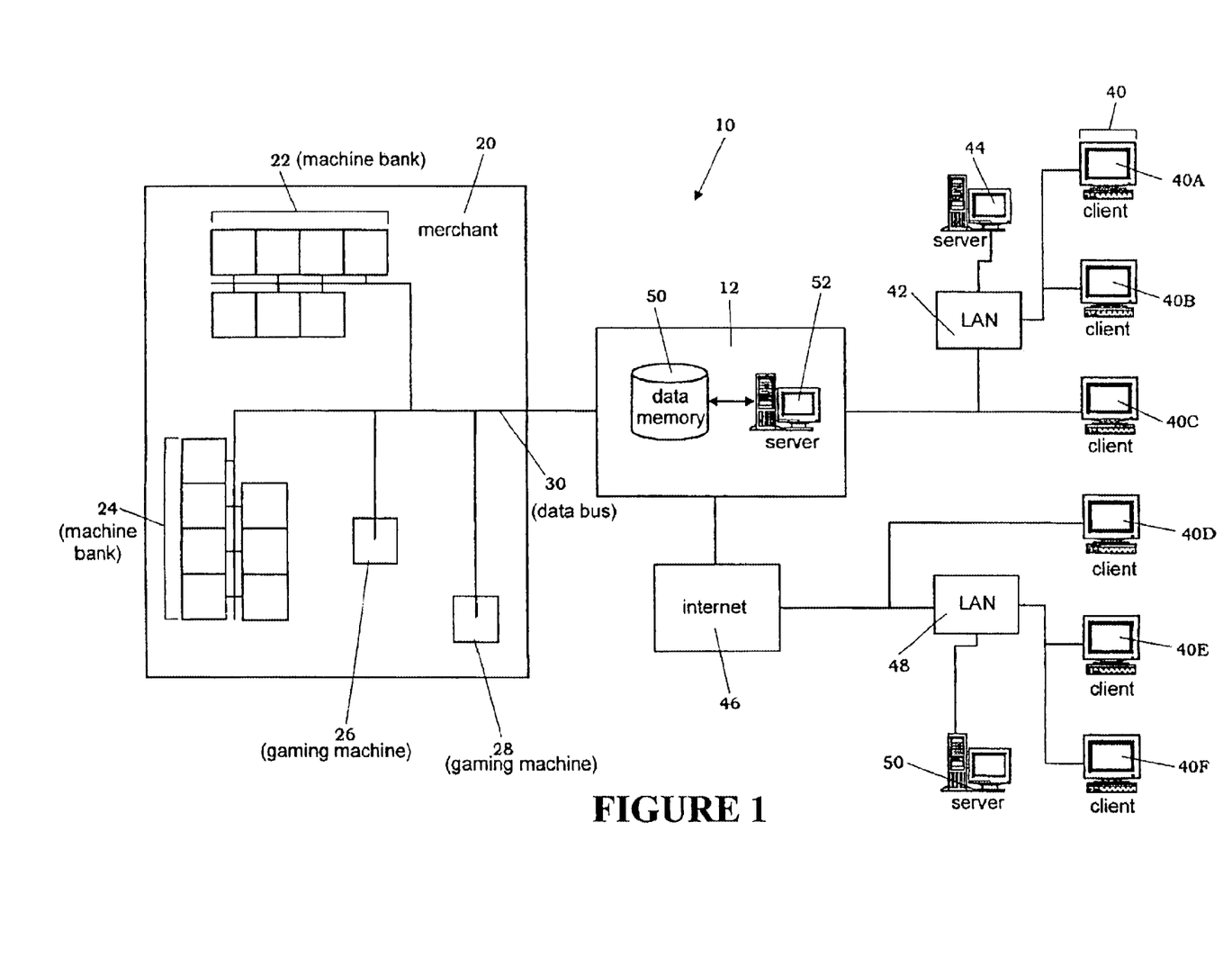
FIG. 1 shows a block diagram of a system in which one form of the invention may be implemented.

FIG. 1 illustrates a block diagram of the preferred system 10 in which one form of the present invention 12 may be implemented. The invention 12 is arranged to compile data from a merchant premises 20.

Typically, a merchant will operate in a commercial premises or store from which a customer purchases goods or services. The merchant may, for example, operate a petrol station in one or more geographic locations. The merchant may alternatively operate a wagering or betting service, or operate a casino or other gaming facility in which a number of gaming machines and stations are positioned in one or more rooms at a common venue.

In FIG. 1, merchant 20 operates a casino having several gaming machines available for interactions with customers in the merchant premises. Gaming machines could be grouped together into machine banks, for example bank 22 and bank 24. The merchant may also operate individual gaming machines, for example machines 26 and 28. Each of the machines in machine banks 22 and 24 and machines 26 and 28 are preferably connected to the invention 12 with a suitable device such as data bus 30, enabling data to be transferred between the machines and the invention 12.

Each machine may be provided with one or more electronic meters, for example a timer, whether the machine is in use, the money placed in the machine or revenue, credit wins (how much money the machine pays back) and how much money is to be paid back by a teller. The data could be transferred in real time to the invention 12 or alternatively the meters could be updated locally at the machine and each machine polled periodically by the invention 12.

The system 10 preferably includes one or more clients 40, for example 40A, 40B, 40C, 40D, 40E and 40F, which each may comprise a personal computer or workstation described below. Each client 40 is interfaced to the invention 12 as shown in FIG. 1. Each client 40 could be connected directly to the invention 12, could be connected through a local area network or LAN, or could be connected through the Internet.

Clients 40A and 40B, for example, are connected to a network 42, such as a local area network or LAN. The network 42 could be connected to a suitable network server 44 and communicate with the invention 12 as shown. Client 40C is shown connected directly to the invention 12. Clients 40D, 40E and 40F are shown connected to the invention 12 through the Internet 46. Client 40D is shown as connected to the Internet 46 with a dial-up connection and clients 40E and 40F are shown connected to a network 48 such as a local area network or LAN, with the network 48 connected to a suitable network server 50.

One preferred form of the invention 12 comprises a personal computer or workstation operating under the control of appropriate operating and application software having a data memory 50 connected to a server 52. The invention is arranged to retrieve or compile data from the merchant premises 20, process the data with the server 52 and to display the data on a client workstation 40, as will be described below.

Figure 2:
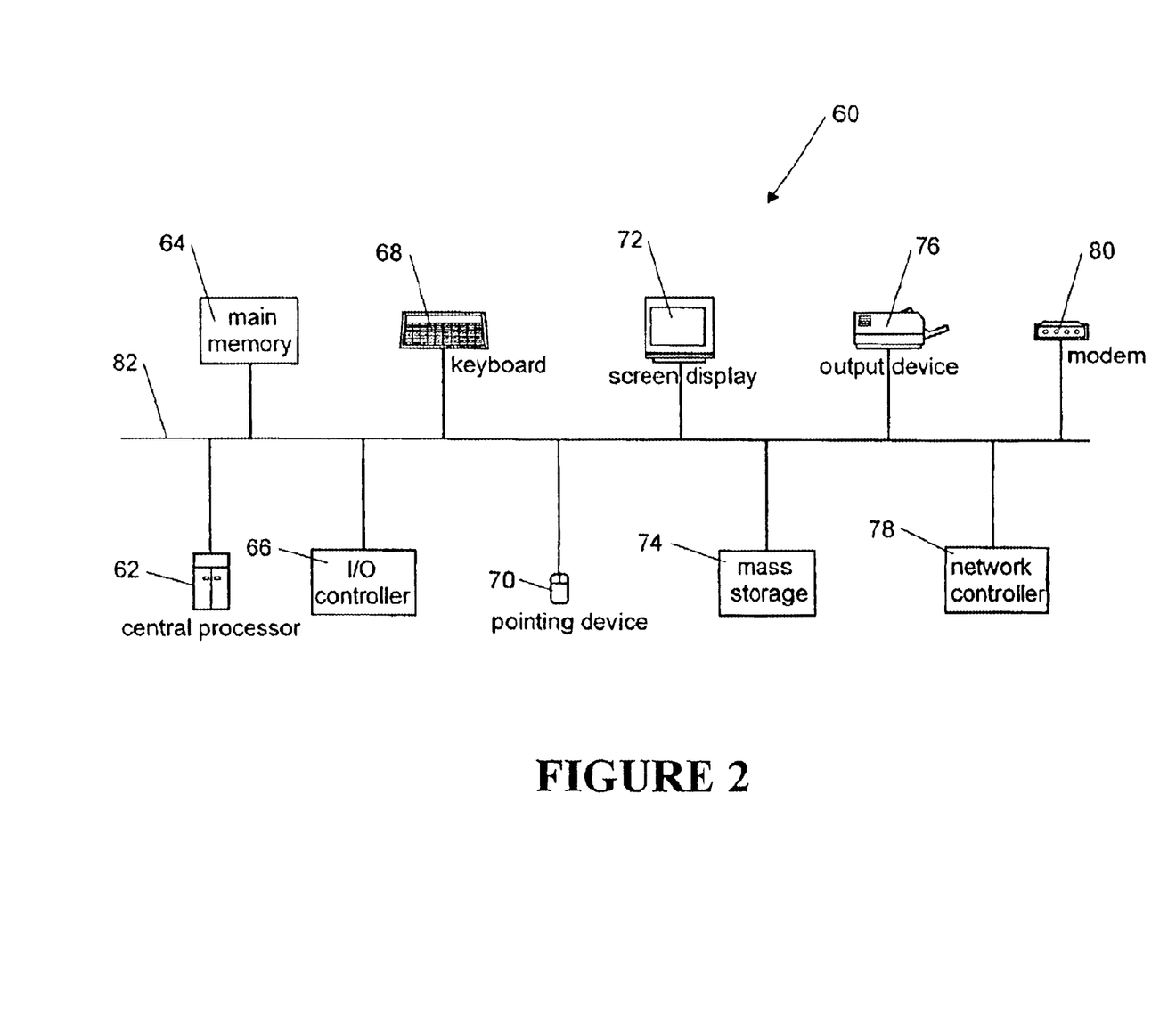
FIG. 2 shows the preferred system architecture of hardware on which the present invention may be implemented.

FIG. 2 shows the preferred system architecture of a client 40 or invention 12. The computer system 60 typically comprises a central processor 62, a main memory 64 for example RAM, and an input/output controller 66. The computer system 60 also comprises peripherals such as a keyboard 68, a pointing device 70 for example a mouse, touch pad or track ball, a display or screen device 72, a mass storage memory 74 for example a hard disk, floppy disk or optical disc, and an output device 76 for example a printer. The system 60 could also include a network interface card or controller 78 and/or a modem 80. The individual components of the system 60 could communicate through a system bus 82.

Figure 3:
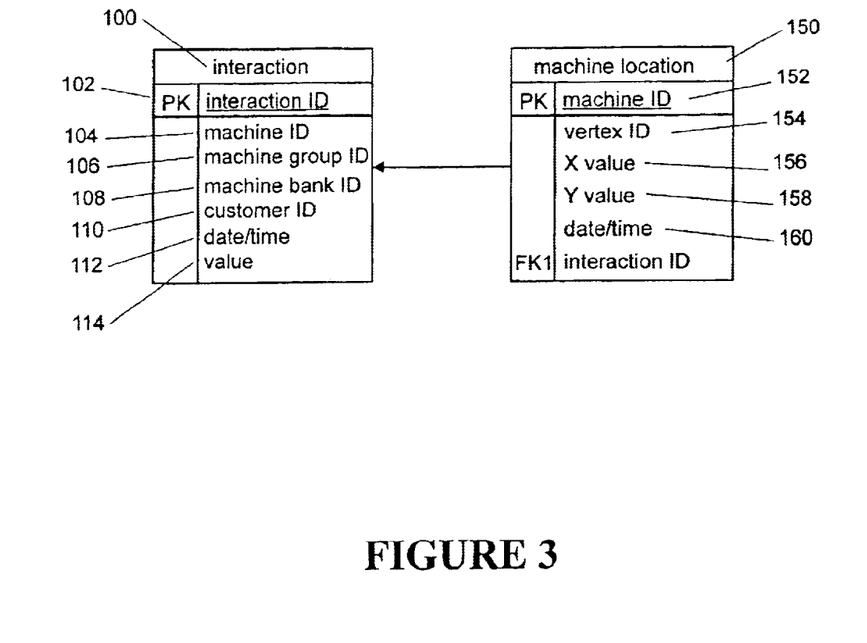
FIG. 3 shows a preferred database schema for storing interaction data.

As a customer interacts with a merchant, the interaction generates interaction data which is then migrated to the data memory 50. Migration may be performed, for example, by way of daily updates. It is advantageous to cleanse, catalogue and validate the interaction data during migration of the data to the memory and this could be performed by either the merchant or a third party. The interaction data could be stored in a number of records in a relational database. FIG. 3 illustrates a typical database schema for storing interaction data. Each interaction record 100 could include an interaction identifier 102 which uniquely identifies the particular interaction between customer and merchant.

Where the merchant operates a casino or gaming facility, the merchant may have assigned to each individual gaming machine a machine identifier. The merchant may also assign a group identifier to a pre-specified group of machines and may also assign a machine bank identifier to a bank of gaming machines. The interaction record 100 could include a machine identifier, a machine group identifier, and a machine bank identifier indicated at 104, 106 and 108 respectively.

The record 100 could also include a customer identifier 110. The merchant may, for example, issue an incentive supported customer loyalty card which is then used by the customer during interactions with the merchant. The loyalty card preferably has stored on it a customer identifier. Alternatively, if the customer pays for the interaction using a credit card, EFTPOS or stored value card, the customer identifier could include an identifier obtained from the card.

The record may also include data such as the date and/or time at which the interaction between the customer and the merchant took place shown at 112. Where it is envisaged that the interactions could be prolonged, for example where a customer maintains an interaction with a gaming machine, the date/time identifier 112 could include the date/time when the interaction commenced and the date/time when the interaction was terminated.

The record 100 could also include the value 114 of the interaction, for example the money transferred from the customer to the gaming machine, and where the machine is arranged to make payouts to the customer, the net value of the interaction.

The interaction data could also include the spatial position of gaming machines, as is more particularly described in our patent specification PCT/NZ00/00101 to Compudigm International Limited filed on 19 Jun. 2000 entitled "Spatial Data Management System and Method" which is incorporated by reference.

The database schema could include a further database table 150 for storing the spatial location of individual machines. It will be appreciated that this table could be normalised to an appropriate extent to avoid data redundancy. It will also be appreciated that table 150 could alternatively be represented in an object-oriented form.

A typical record 150 could include a machine identifier 152 to identify the particular gaming machine. The record preferably represents each gaming machine as a set of vertices which together define the polygon representing a 2-dimensional plan view of each machine. Each data set preferably defines the geographic co-ordinates of the vertices of each polygon.

Table 150 could include a vertex identifier 154 to identify an individual vertex of a particular gaming machine. Position data such as x co-ordinates indicated at 156 and y co-ordinates indicated at 158 could represent the geographic position of an individual vertex in the New Zealand Map Grid (NZMG) Local Co-ordinate System Notation. It is envisaged that the geographic co-ordinates could alternatively be represented in Australian Map Grid (AMG) Notation, in WGS84, or as a latitude or longitude, or in any other suitable map grid notation system.

The schema 150 could also include a date and/or time field 160 for storing the date and/or time a particular machine location record is created or edited. This would enable the invention to keep track of changes made to the positions of individual gaming machines stored in the database.

Figure 4:
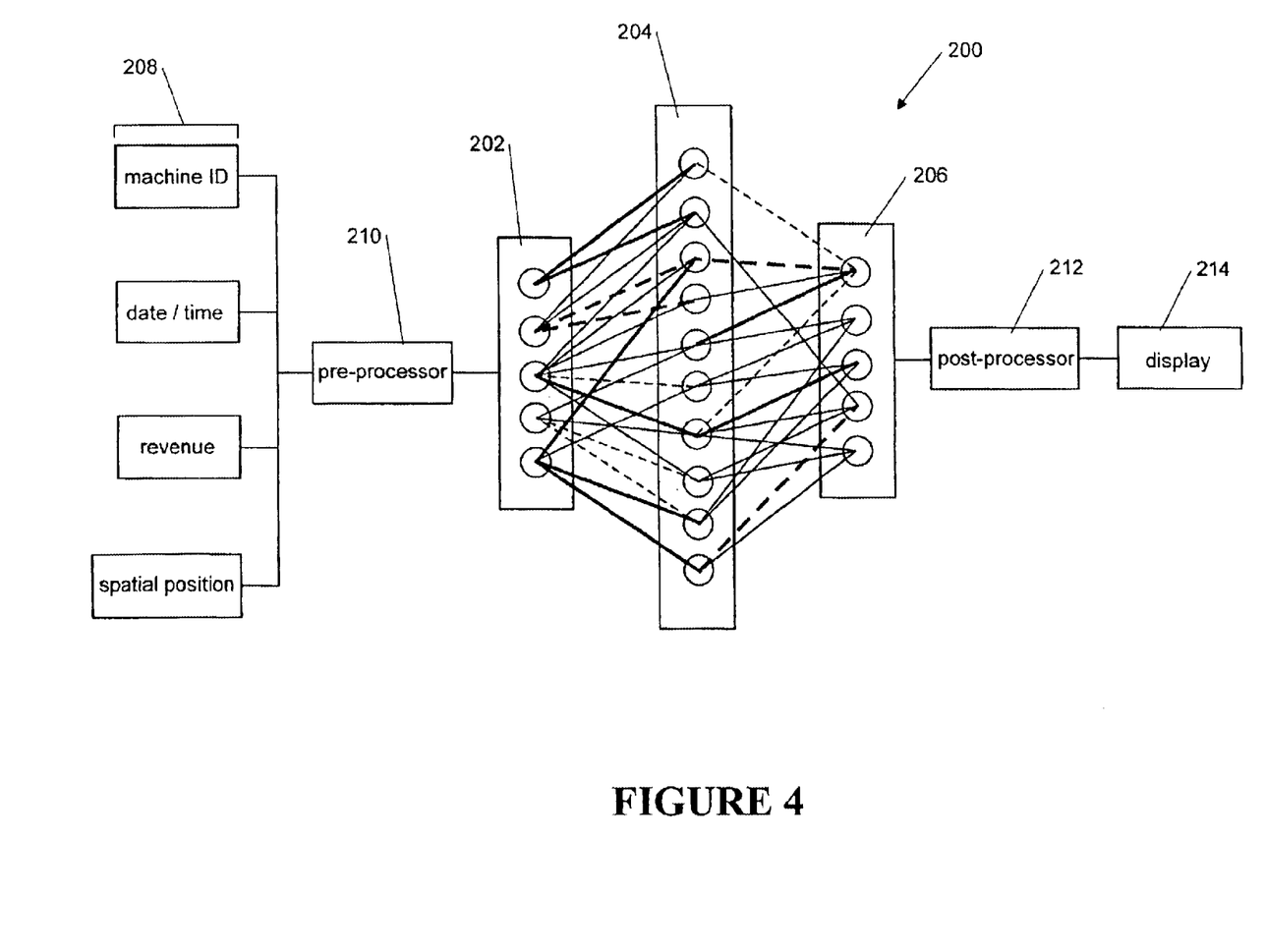
FIG. 4 is a block diagram of the preferred neural network of the invention.

Referring to FIG. 4, in one preferred form of the invention, a neural network 200 is arranged to run on the server 52. The preferred neural network could be implemented in C++, Visual Basic, or another object-oriented language suitable for the purpose. Where the system includes only one processor or server, each neuron could be arranged to run on that processor. Where the system includes more than one processor, the neurons could be arranged to run on different processors. Ideally each neuron will run on a separate processor.

The preferred neural network 200 is a multi layer perceptron having an input layer 202, a hidden layer 204, and an output layer 206. It is envisaged that the network 200 could include more than one hidden layer. The input layer 202 and output layer 206 are shown as including 5 nodes and the hidden layer 204 shown as including 10 nodes. It will be appreciated that the number of nodes in each of the layers could be varied significantly. It is however usual that where there is n nodes in the input layer there are n(n−1)/2 nodes in the hidden layer.

Signals are received by one or more nodes in the input layer 202. These signals are transformed and output to nodes in the hidden layer 204. As shown in FIG. 4, the neural network 200 may be arranged so that output signals from each node in the input layer 202 are sent to each node in the hidden layer 204.

The output signal from each node in the input layer 202 could be multiplied by a weight before reaching a node in the hidden layer 204. In FIG. 4, for example, signals having positive weights are shown as solid lines, while signals having negative weights are shown as dotted lines. The absolute value of the weight may also be varied, and in FIG. 4 the thickness of the line indicating a signal is proportional to the absolute value of the weight on that signal.

Signals received by nodes in the hidden layer 204 are transformed and output to one or more nodes in the output layer 206. Each node in the hidden layer 204 may be arranged to send an output signal to the output layer 206.

Once again, the signals may be weighted, and positive weights are indicated as solid lines and negative weights are indicated as dotted lines. The absolute value of the weight may also be varied, and the thickness of the line is proportional to the absolute value of the weight attached to a particular signal.

The preferred neural network is arranged so that each node receives a signal as input, performs a transfer or activation function on the signal, and outputs a numerical value as a result of this function. This transfer function could be, for example, the following logistic function:

$$out = f(in) = \frac{1}{1 + \exp^{-in}}$$

Advantages of this logistic function are that it is infinitely differentiable, it is smooth, monotonically increasing, and maps the real line on the (0, 1) interval. If the original signal is too strong, it will give an output close to 1. If the signal is too weak, it will give an output close to 0.

It is envisaged that other known functions suitable for the purpose could replace the above logistic function, for example a linear function such as:

$$out = f(in) = \frac{1}{L(in)}$$

where L is a linear function.

Although the preferred neural network is arranged so that nodes in the input layer 202 send output signals to the nodes in the hidden layer 204, and nodes in the hidden layer 204 send output signals to node(s) in the output layer 206, it is envisaged that some nodes in the input layer 202 may be arranged to transfer signals directly to node(s) in the output layer 206. Such direct connections may be suitable for approximating linear functions. It is also envisaged, as shown in FIG. 4, that some nodes in the input layer do not send signals to all nodes in the notation layer, and some nodes in the hidden layer do not send signals to all nodes in the output layer.

The neural network 200 is preferably trained on interaction data retrieved from the data memory 50. Interaction records as indicated at 208 could include the machine, group and/or machine bank identifier, the date/time, the revenue and/or the spatial position. Each interaction record is preferably fed to a pre-processor 210 which could transform the input data into a manner suitable for the neural network 200. The range of values could be transformed, for example, so that the values belong in the (0,1) interval.

The pre-processor 210 could also determine the particular data on which the neural network will be trained. The pre-processor, for example, could assign null weights to various fields of the interaction records with the result that this information is not fed to the neural network. Other fields which could be more important are assigned non-null weights and could also be ranked above other non-null weights. The pre-processor could include a linear function, a non-linear function and/or another neural network to transform the values to a range suitable for the neural network 200.

The neural network 200 could also include a post-processor 212 which could be arranged to apply the inverse function used by the pre-processor 210 and display the output value or values in a suitable format with a display means 214. It is envisaged that post-processing could include a linear function, a non-linear function or another neural network.

Figure 5:
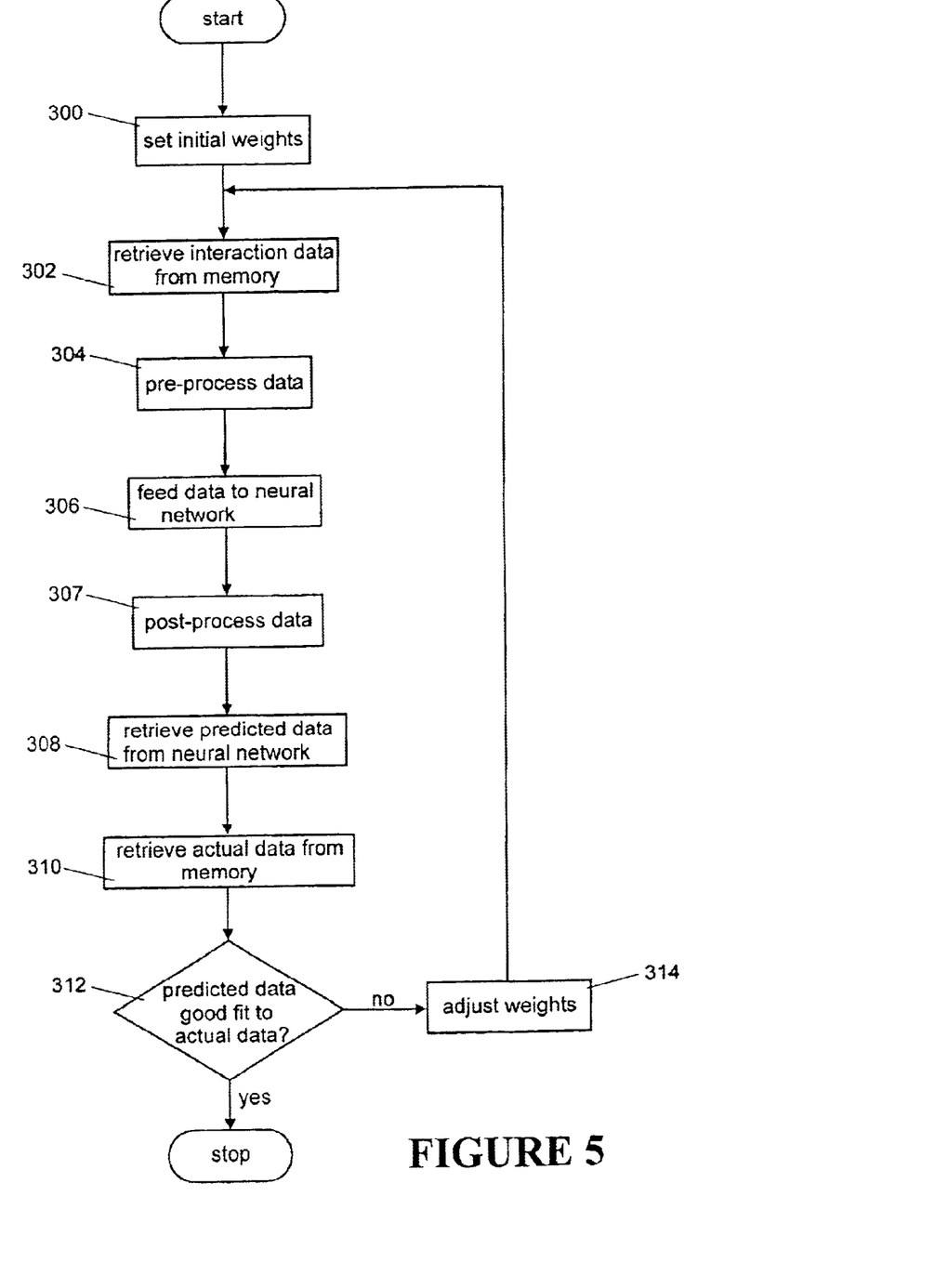
FIG. 5 is a flow chart of one method of training the neural network.

FIG. 5 illustrates one preferred method of training the neural network. The network is first initialised by setting initial signal weights as indicated at 300. One method of initialisation involves setting weights to random values initially.

As indicated at 302, data representing interactions between customers and merchants is retrieved from memory 50. As shown at 304, the data retrieved from memory 50 could undergo pre-processing. The data could be transformed in a manner suitable for the neural network, for example the range of values could be transformed so that the values belong in the (0,1) interval. The data could be scaled by a preprocessing function so that the maximum input values would be scaled to 1, and values less than the maximum lie between 0 and 1. The pre-processing function could include a linear function, a non-linear function, or another neural network, to transform the values to a range suitable for the purpose.

As shown in 306, the data is then fed to the neural network. It will be appreciated that this data could be raw data retrieved from the memory at step 302, could be data preprocessed by the step of 304, or could be a mix of raw and processed data.

The neural network then acts on the input data and produces an output value or values. This output value could be in the (0, 1) interval where the input data has been preprocessed. Postprocessing may then be performed, as indicated at 307 by applying the inverse function used for preprocessing and displaying the output value as a revenue currency value. It is envisaged that postprocessing could include a linear function, a non-linear function, or another neural network.

The output value produced by the neural network represents the predicted value retrieved at step 308, and by calculating the actual value from data retrieved from the memory, the correctness of the predicted value can be determined as the fit of the predicted data to the actual data as indicated at 312. For example, where the neural network is trained to predict the revenue of a gaming machine or machine bank, the value output by the neural network could be compared to the actual revenue generated by the machine or machine bank.

The weights of the network can then be adjusted as shown at 314, based on the comparison between the predicted data and the actual data. These weights may be adjusted by any known algorithm suitable for the purpose, for example, a back propagation algorithm. If the predicted data is not a good fit to the actual data, the learning algorithm may be repeated and the weights adjusted until such time as a good fit is obtained.

Figure 6:
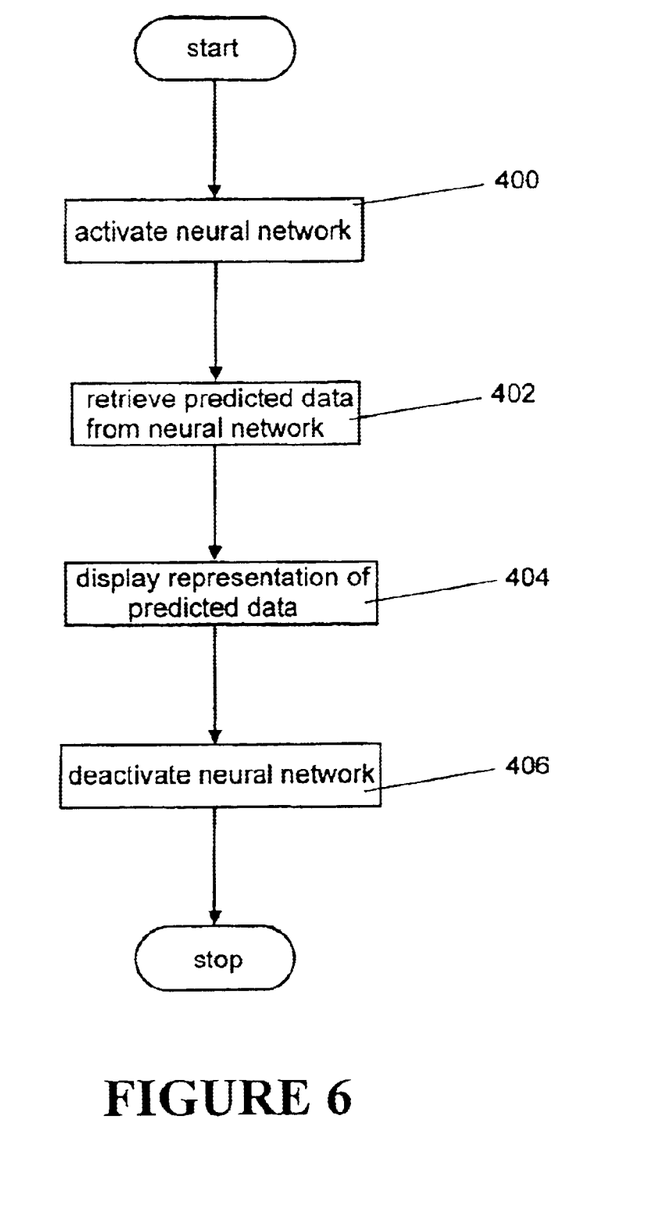
FIG. 6 is a flow chart showing use of the trained neural network.

Once learning is complete, the neural network may then be used to predict future interactions. FIG. 6 illustrates use of the preferred system for this purpose. The neural network is first activated as shown at 400. The network calculates and outputs predicted data representing future interactions between customers and merchants.

As indicated at 402, this data is retrieved from the neural network and as shown at 404, the data is displayed to the user, following which the neural network is deactivated as shown at 406.

The invention in one further preferred form could be arranged to display a contoured representation of data superimposed on a graphical spatial representation of the premises of the merchant generated by the system. Contoured representations are further described in published PCT WO 00/77682 A1 to Compudigm International Limited published on 21 Dec. 2000 entitled "Data Visualisation System and Method" which is incorporated by reference.

Figure 7:
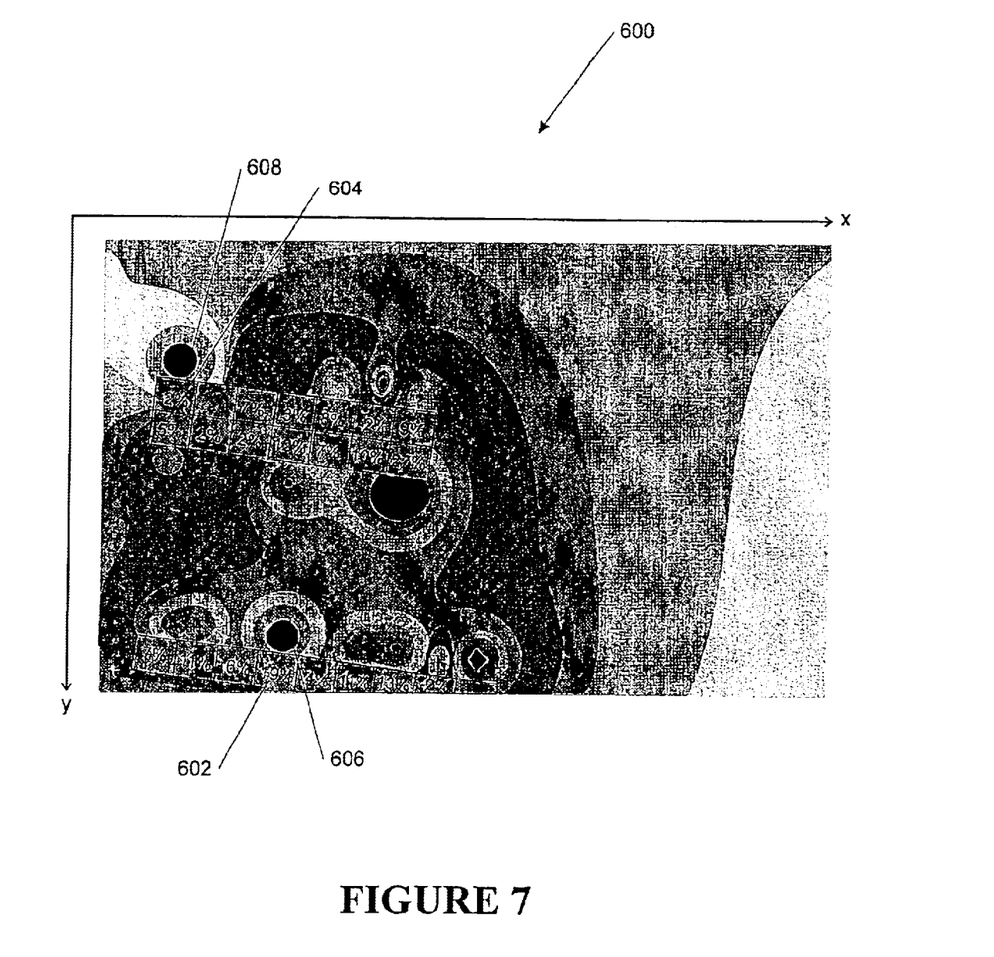
FIG. 7 is a data visualisation generated in accordance with one form of the invention.

FIG. 7 illustrates at 600 one example of a display generated by the system where the merchant operates a casino or similar gaming venue. In this example, a representation of the merchant is generated and displayed in accordance with the invention. The graphical representation comprises a spatial representation of an area of the casino showing the layout of individual gaming machines and machine banks, two of which are indicated at 602 and 604 respectively.

The representation 600 could be arranged to display the revenue obtained from an individual gaming machine or could display some other key performance indicator. The revenue for each machine is preferably graphically represented adjacent or near to the representation of the individual machine. There are a finite number of machines in the casino, and the individual revenues generated from each machine represent a finite set of data values. These data values are graphically illustrated as data points in the representation 600. For example, the revenue or data value for machine 602 is graphically illustrated as data point 606 and the data value or revenue for machine 604 is graphically illustrated as data point 608.

The preferred representation 600 is colour-coded and the value of revenue of each machine is illustrated by representing the corresponding data points in the appropriate colour to represent the correct value of revenue of each machine. It is envisaged that the invention could also display both predicted and actual data values.

The areas of the representation 600 around each data point are shown as contours. The nature of the contours for each data point are preferably represented to gradually drop off or fall away from each data point. Each data point could be represented by x and y co-ordinates indicating the relative position of each data point in the representation. Each data point could also have a z value representing the height or magnitude of the data point. This z value could indicate, for example, the revenue or data value at a particular data point. Each data value is therefore centred on a data point.

In summary, the invention provides an interaction prediction system and method designed to assist a casino or gaming machine operator to predict future revenue from individual gaming machines in a casino. It will be appreciated that the same invention could also have application in other areas, for example, the layout and arrangement of products in retail premises and the resulting sales of those products.

The foregoing describes the invention including preferred forms thereof. Alterations and modifications as will be obvious to those skilled in the art are intended to be incorporated within the scope hereof, as defined by the accompanying claims.

What is claimed is:

1. An interaction prediction system comprising:
    a memory in which is maintained a neural network trained on data retrieved from an interaction database of interaction data representing interactions between customers and gaming machines, the interaction data including at least one gaming machine identifier, and at least one monetary value for the interaction;
    a retrieval component arranged to activate the neural network and to retrieve prediction data representing predicted revenue from future interactions between customers and individual gaming machines; and
    a display arranged to display a representation of the prediction data.

2. An interaction prediction system as claimed in claim 1 wherein the interaction data includes the date and/or time of the interaction and wherein the neural network is trained on data including the date and/or time of the interaction.

3. An interaction prediction system as claimed in claim 1 wherein the interaction data includes the spatial position of the machine involved in the interaction and wherein the neural network is trained on data including the spatial position of the machine involved in the interaction.

4. An interaction prediction system as claimed in claim 3 wherein the neural network is trained on data including the machine identifier and/or spatial position of machines neighboring the machine involved in the interactions.

5. A neural network training system comprising:
    a memory in which is maintained an interaction database of interaction data representing interactions between customers and gaming machines, the interaction data including at least one gaming machine identifier and at least one monetary value for the interaction;

a retrieval component arranged to retrieve from the interaction database data representing interactions between customers and gaming machines;

a neural network arranged to receive input data representing the data retrieved from the interaction database and to output prediction data representing predicted revenue from future interactions between customers and individual gaming machines predicted by the neural network; and a training component arranged to compare the data retrieved from the interaction database and the prediction data and to adjust the neural network based on the comparison.

6. A neural network training system as claimed in claim 5 wherein the interaction data includes the date and/or time of the interaction, the neural network further arranged to receive as input the date and/or time of interactions between customers and merchants.

7. A neural network training system as claimed in claim 5 wherein the interaction data includes the spatial position of the machine involved in the interaction and wherein the neural network is further arranged to receive as input the spatial position of the machine involved in the interaction.

8. A neural network training system as claimed in claim 7 wherein the neural network is arranged to receive as input the machine identifier and/or spatial position of machines neighboring the machine involved in the interactions.

9. An interaction prediction computer program comprising:

a neural network maintained in a memory, the neural network trained on data retrieved from an interaction database of interaction data representing interactions between customers and gaming machines, the interaction data including at least one gaming machine identifier and at least one monetary value for the interaction;

a retrieval component configured to activate the neural network, to retrieve prediction data representing predicted revenue from future interactions between customers and individual gaming machines, and to display a representation of the prediction data.

10. A computer program as claimed in claim 9 wherein the interaction data includes the date and/or time of the interaction and wherein the neural network is trained on data including the date and/or time of the interaction.

11. A computer program as claimed in claim 9 wherein the interaction data includes the spatial position of the machine involved in the interaction and wherein the neural network is trained on data including the spatial position of the machine involved in the interaction.

12. A computer program as claimed in claim 11 wherein the neural network is trained on data including the machine identifier and/or spatial position of machines neighboring the machine involved in the interactions.

13. A computer program as claimed in claim 9 embodied on a computer readable medium.

14. A neural network training computer program comprising:

an interaction database of interaction data representing interactions between customers and gaming machines, the interaction data including at least one gaming machine identifier, and at least one monetary value for the interaction;

a retrieval component configured to retrieve from the interaction database data representing interactions between customers and gaming machines;

a neural network maintained in a memory, the neural network configured to receive input data representing the data retrieved from the interaction database and to output prediction data representing predicted revenue from future interactions between customers and individual gaming machines predicted by the neural network, and a training component configured to compare the data retrieved from the interaction database and the prediction data and to adjust the neural network based on the comparison.

15. A computer program as claimed in claim 14 wherein the interaction data includes the date and/or time of the interaction, the neural network further configured to receive as input the date and/or time of interactions between customers and merchants.

16. A computer program as claimed in claim 14 wherein the interaction data includes the spatial position of the machine involved in the interaction and wherein the neural network is further configured to receive as input the spatial position of the machine involved in the interaction.

17. A computer program as claimed in claim 16 wherein the neural network is arranged to receive as input the machine identifier and/or spatial position of machines neighboring the machine involved in the interactions.

18. A computer program as claimed in claim 14 embodied on a computer readable medium.

19. A method of predicting interactions between customers and merchants, the method comprising the steps of:

maintaining in a memory a neural network trained on data retrieved from an interaction database of interaction data representing interactions between customers and gaming machines, the interaction data including at least one gaming machine identifier and at least one monetary value for the interaction;

activating the neural network;

retrieving prediction data representing predicted revenue from future interactions between customers and individual gaming machines from the neural network; and displaying a representation of the prediction data.

20. A method as claimed in claim 19 wherein the interaction data includes the date and/or time of the interaction and wherein the neural network is trained on data including the date and/or time of the interaction.

21. A method as claimed in claim 19 wherein the interaction data includes the spatial position of the machine involved in the interaction and wherein the neural network is trained on data including the spatial position of the machine involved in the interaction.

22. A method as claimed in claim 21 wherein the neural network is trained on data including the machine identifier and/or spatial position of machines neighboring the machine involved in the interactions.

23. A method of training a neural network comprising the steps of:

maintaining in a memory an interaction database of interaction data representing interactions between customers and gaming machines, the interaction data including at least one gaming machine identifier and at least one monetary value for the interaction;

retrieving from the interaction database data representing interactions between customers and gaming machines;

configuring a neural network to receive input data representing the data retrieved from the interaction database and to output prediction data representing predicted revenue from future interactions between customers and individual gaming machines predicted by the neural network; and comparing the data retrieved from the interaction database and the prediction data and adjusting the neural network based on the comparison.

24. A method as claimed in claim 23 wherein the interaction data includes the date and/or time of the interaction, the neural network further configured to receive as input the date and/or time of interactions between customers and merchants.

25. A method as claimed in claim 23 wherein the interaction data includes the spatial position of the machine involved in the interaction and wherein the neural network is further configured to receive as input the spatial position of the machine involved in the interaction.

26. A method as claimed in claim 25 wherein the neural network is arranged to receive as input the machine identifier and/or spatial position of machines neighboring the machine involved in the interactions.

27. A neural network trained by the method as claimed in claim 23.

* * * * *